United States Patent
Loehr et al.

(10) Patent No.: US 11,956,832 B2
(45) Date of Patent: Apr. 9, 2024

(54) RANDOM-ACCESS PROCEDURE FOR SCHEDULING REQUEST

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/120,938

(22) Filed: Mar. 13, 2023

(65) Prior Publication Data

US 2023/0217500 A1    Jul. 6, 2023

Related U.S. Application Data

(63) Continuation of application No. 17/204,860, filed on Mar. 17, 2021, now Pat. No. 11,617,212, which is a (Continued)

(51) Int. Cl.
*H04W 74/0833* (2024.01)
*H04W 28/02* (2009.01)
(Continued)

(52) U.S. Cl.
CPC ... *H04W 74/0833* (2013.01); *H04W 28/0278* (2013.01); *H04W 72/23* (2023.01); *H04W 80/02* (2013.01)

(58) Field of Classification Search
CPC .......... H04W 74/0833; H04W 72/23; H04W 28/2078; H04W 80/02
See application file for complete search history.

(56) References Cited

U.S. PATENT DOCUMENTS

2009/0201868 A1  8/2009  Chun et al.
2010/0077100 A1  3/2010  Hsu et al.
(Continued)

FOREIGN PATENT DOCUMENTS

EP    3793308 A1    3/2021

OTHER PUBLICATIONS

Qualcomm Incorporated, "Open Issues on BWP", 3GPP TSG RAN WG1 #91 R1-1720693, Nov. 27-Dec. 1, 2017, pp. 1-15.
(Continued)

*Primary Examiner* — Duc C Ho
(74) *Attorney, Agent, or Firm* — Kunzler Bean & Adamson

(57) ABSTRACT

Apparatuses, methods, and systems are disclosed for efficiently transmitting a SR. One apparatus includes a memory comprising instructions executable by a processor to cause the apparatus to trigger a buffer status report for a first logical channel and trigger a SR for the first logical channel based at least in part on the triggered buffer status report. The instructions are executable by the processor to cause the apparatus determine whether a SR configuration associated with the first logical channel is configured with a set of PUCCH resources for a transmission of a SR on a current active BWP and initiate a RACH procedure for requesting uplink resources if the SR configuration associated with the first logical channel is not configured with the set of PUCCH resources for the transmission of the SR on the current active BWP.

20 Claims, 10 Drawing Sheets

Related U.S. Application Data continuation of application No. 16/226,022, filed on Dec. 19, 2018, now Pat. No. 10,986,667.

(60) Provisional application No. 62/608,517, filed on Dec. 20, 2017.

(51) Int. Cl.
  *H04W 72/23* (2023.01)
  *H04W 74/08* (2009.01)
  *H04W 80/02* (2009.01)

(56) References Cited

U.S. PATENT DOCUMENTS

| | | |
|---|---|---|
| 2010/0265896 A1 | 10/2010 | Park et al. |
| 2010/0284354 A1 | 11/2010 | Ostergaard et al. |
| 2010/0322172 A1 | 12/2010 | Hsu |
| 2017/0202007 A1 | 7/2017 | Miao et al. |
| 2018/0077719 A1 | 3/2018 | Nory et al. |
| 2018/0324867 A1 | 11/2018 | Basu Mallick et al. |
| 2019/0132857 A1 | 5/2019 | Babaei et al. |
| 2019/0166623 A1* | 5/2019 | Wei .................. H04W 72/21 |
| 2020/0092895 A1 | 3/2020 | Wang |
| 2020/0120560 A1 | 4/2020 | Sunell et al. |

OTHER PUBLICATIONS

Huawei, Hisilicon, "Sr triggering and cancellation", 3GPP TSG-RAN WG2 NR Ad Hoc R2-1706986, Jun. 27-29, 2017, pp. 1-3.

Huawei, Hisilicon, "User plane impacts for Bandwidth Parts", 3GPP TSG-RAN WG2 #99bis R2-1710217, Oct. 9-13, 2017, pp. 1-6.

Xiaomi, "Additional Issues of the SR Procedure", 3GPP TSG-RAN2 #100 R2-1713938, Nov. 27-Dec. 1, 2017, pp. 1-4.

LG Electronics Inc., "TP for BWP", 3GPP TSG-RAN WG2 Meeting #100 Draft R2-1714046, Nov. 27-Dec. 1, 2017, pp. 1-5.

3GPP, "3rd Generation Partnership Project; Technical Specification Group Services and System Aspects; System Architecture for the 5G System; Stage 2 (Release 15)", 3GPP TS 23.501 V1.5.0, Nov. 2017, pp. 1-170.

3GPP, "3rd Generation Partnership Project; Technical Specification Group and System Aspects; Procedures for the 5G System; Stage 2 (Release 15)", 3GPP TS 23.502 V1.3.0, Nov. 11, 2017, pp. 1-215.

3GPP, "3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.1.0, Dec. 2016, pp. 1-98.

* cited by examiner

RANDOM-ACCESS PROCEDURE FOR SCHEDULING REQUEST

CROSS-REFERENCE TO RELATED APPLICATIONS

This application is a continuation of patent application Ser. No. 17/204,860, issued as U.S. Pat. No. 11,617,212, entitled "RANDOM-ACCESS PROCEDURE FOR SCHEDULING REQUEST" filed on Mar. 17, 2021 for Joachim Loehr, Prateek Basu Mallick, and Ravi Kuchibhotla, which application is a continuation of patent application Ser. No. 16/226,022, issued as U.S. Pat. No. 10,986,667, entitled "RANDOM-ACCESS PROCEDURE FOR SCHEDULING REQUEST" filed on Dec. 19, 2018 for Joachim Loehr, Prateek Basu Mallick, and Ravi Kuchibhotla, which claims priority to U.S. Provisional Patent Application No. 62/608,517 entitled "Efficiently Transmitting a Scheduling Request" and filed on Dec. 20, 2017 for Joachim Loehr, Prateek Basu Mallick, and Ravi Kuchibhotla which is incorporated herein by reference.

FIELD

The subject matter disclosed herein relates generally to wireless communications and more particularly relates to efficiently transmitting a scheduling request.

BACKGROUND

In Fifth Generation ("5G") networks, uplink ("UL") transmissions are scheduled for a User Equipment ("UE") in response to a scheduling request ("SR") for a radio bearer ("RB") and/or Logical Channel ("LCH") having an SR configuration. In case a RB/LCH has no SR configuration, the UE initiates a random-access procedure ("RACH procedure") to schedule UL transmissions. However, performing the RACH procedure and the dedicated SR procedure in parallel posts several technical challenges, such as UL transmission power control.

BRIEF SUMMARY

Methods for efficiently transmitting a scheduling request are disclosed. Apparatuses and systems also perform the functions of the methods.

One method at a UE includes triggering a Buffer Status Report ("BSR") for a first LCH and triggering a SR for the first LCH based at least in part on the triggered BSR. The fourth method includes determining whether a SR configuration associated with the first LCH is configured with a set of Physical Uplink Control Channel ("PUCCH") resources for a transmission of a SR on a current active Bandwidth Part ("BWP") and initiating a RACH procedure for requesting UL resources based on determining that the SR configuration associated with the first LCH is not configured with the set of PUCCH resources for the transmission of the SR on the current active BWP.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
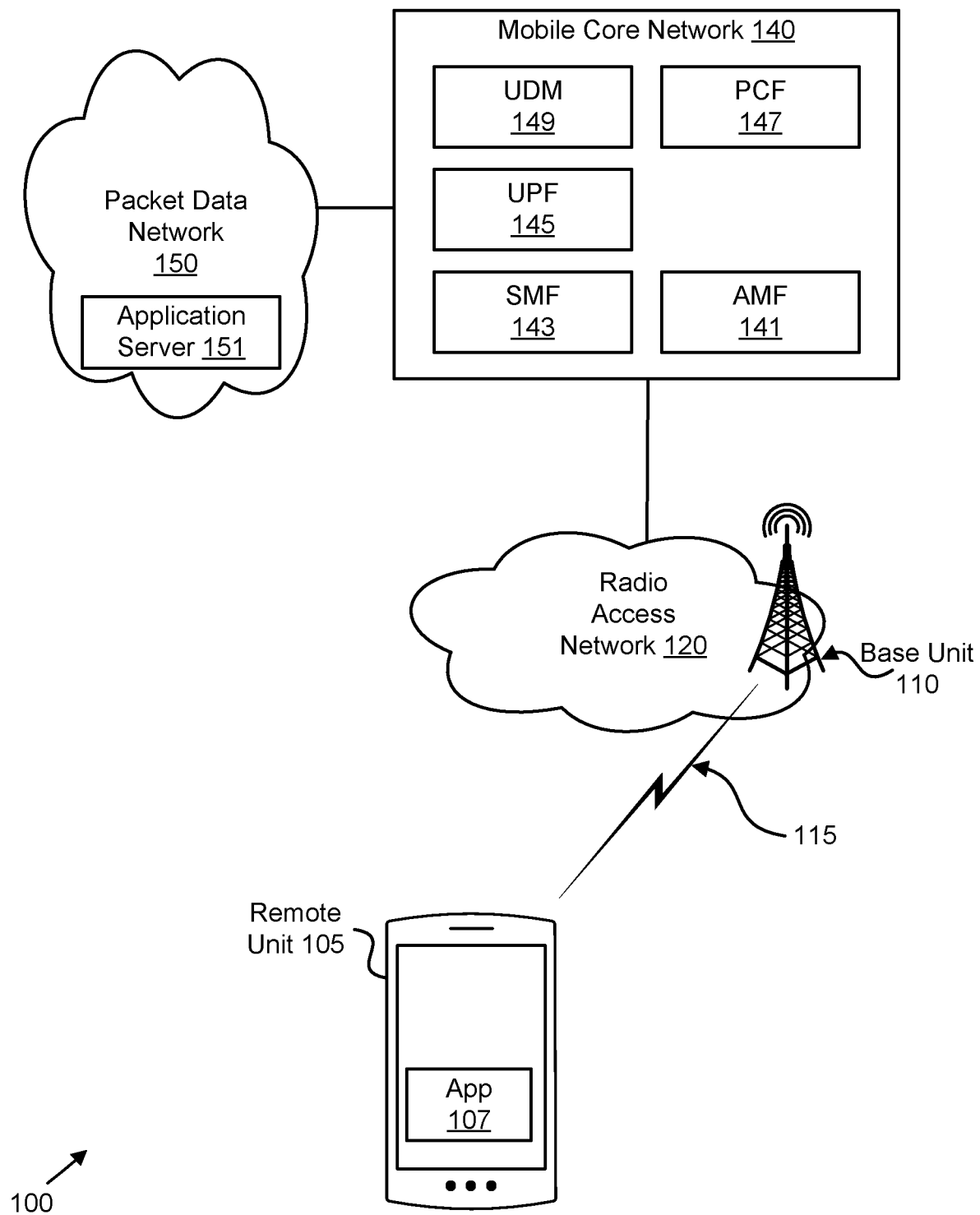
FIG. 1 is a schematic block diagram illustrating one embodiment of a wireless communication system for efficiently transmitting a scheduling request.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable ROM ("EPROM" or Flash memory), a portable compact disc ROM ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

With 5G New Radio ("NR"), the radio interface supports different Orthogonal Frequency Division Multiplexing ("OFDM") numerologies in a single framework, thereby supporting the various service requirements of different services, such as enhanced mobile broadband ("eMBB"), ultra-reliable low-latency communications ("URLLC"), and/or massive machine-type communication ("mMTC"). An OFDM numerology (e.g., subcarrier spacing, OFDM symbol duration, cyclic prefix ("CP") duration, number of symbols per scheduling interval) that is suitable for one use case might not work well for another. For example, low-latency services may require a shorter symbol duration (and thus larger subcarrier spacing) and/or fewer symbols per scheduling interval (aka, per Transmission Time Interval ("TTI")) than an mMTC service. Furthermore, deployment scenarios with large channel delay spreads require a longer CP duration than deployment scenarios with short delay spreads. As such, the subcarrier spacing should be optimized accordingly to retain similar CP overhead.

When LCH prioritization ("LCP") restrictions are configured for a Medium Access Control ("MAC") entity by Radio Resource Control ("RRC"), it is possible to limit the usage of a particular numerology and/or Physical Uplink Shared Channel ("PUSCH") transmission duration (e.g., TTI length) to a subset of the LCHs configured. With such restrictions, it then becomes possible to reserve, for instance, the numerology with the largest subcarrier spacing and/or shortest transmission timing for URLLC services. A single MAC entity can support one or multiple numerologies and/or transmission durations and mapping restrictions in LCP controls which numerology and/or transmission duration a LCH can use.

With Bandwidth Adaptation ("BA"), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a BWP, and BA is achieved by configuring the UE with BWP(s) and telling the UE which of the configured BWPs is currently the active one.

In order to enable efficient scheduling of UL transmissions by having a closer match of UL transmission parameters (including numerology and PUSCH transmission duration) for the first PUSCH transmission to LCH requirements, NR supports an early indication to the gNB of the type of traffic on the LCH(s) triggering the SR, through the use of multiple, single-bit SR configurations. The MAC entity may be configured with zero, one, or more SR ("SR") configurations. An SR configuration consists of a set of PUCCH resources for SR across different BWPs and serving cells. For a RB/LCH, at most one PUCCH resource for dedicated SR is configured per BWP. Each RB/LCH may be mapped to zero or one SR configuration, which is configured by RRC. In case a RB/LCH has no SR configuration, UE initiates the RACH procedure in case BSR is triggered due to data arrival in this RB/LCH.

To overcome difficulties of performing the RACH procedure and the dedicated SR procedure in parallel, e.g., simultaneous transmission of a RACH message on the Physical Random Access Channel ("PRACH") and a SR on the PUCCH, the UE selectively uses PRACH and PUCCH resources to transmit an SR when the LCH which triggered the SR does not have valid, dedicated PUCCH resources on the active BWP. Note that an active BWP may include an active UL BWP and/or an active downlink BWP.

FIG. 1 depicts a wireless communication system 100 for efficiently transmitting a SR, according to embodiments of the disclosure. In one embodiment, the wireless communication system 100 includes at least one remote unit 105, a RAN 120, and a mobile core network 140. The RAN 120 and the mobile core network form a mobile communication network. The RAN 120 may be composed of a base unit 110 and/or a RAN 120 containing at least one base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the Third Generation Partnership Project ("3GPP") specifications. More generally, however, the wireless communication system 100 may implement some other open or proprietary communication network, for example, Long Term Evolution ("LTE") or Worldwide Interoperability for Microwave Access ("WiMAX"), among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via UL and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a Protocol Data Unit ("PDU") session (or another data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a RAN, such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one user plane function ("UPF") 145. The mobile core network 140 also includes multiple control plane functions including, but not limited to, an Access and Mobility Management Function ("AMY") 141 that serves the RAN 120, a Session Management Function ("Skit") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over Application Programming Interfaces ("APIs")), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an Mobility Management Entity ("MIME"), Serving Gateway ("S-GW"), Packet data network Gateway ("P-GW"), Home Subscriber Server ("HSS"), and the like. In certain embodiments, the mobile core network 140 may include a Authentication, Authorization, and Accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the Skit 143 and UPF 145. In some embodiments, the different network slices may share some common network functions, such as the AMF 141. The different network slices are not shown in FIG. 1 for ease of illustration, but their support is assumed.

As discussed in further detail below, the remote unit 105 may request UL share channel resources (e.g., PUSCH resources) for transmission of data of a LCH. Here, the remote unit 105 may prepare a SR configuration for a LCH. Here, the SR configuring includes a set of PUCCH resources for transmission of a SR signal. Moreover, upon arrival of data for said LCH (e.g., generated by the mobile application 107), the remote unit 105 may trigger a BSR for the LCH and trigger a SR for the LCH.

Based on the SR configuration and the current active BWP, there may be no PUCCH resources dedicated for the remote unit 105 to transmit a SR signal for the LCH. In such a scenario, is inadvisable to delay the transmission of SR on (dedicated) PUCCH until the network (e.g., RAN 120) provides dedicated PUCCH resources for SR for the LCH, as this may incur a significant additional latency which may be unacceptable for the services supported by the LCH.

In various embodiments, if there are no PUCCH resources dedicated for transmission of a SR signal for the LCH on the current active BWP, then the remote unit 105 triggers/initiates a RACH procedure. In other embodiments, if there are no PUCCH resources dedicated for transmission of a SR signal for the LCH, then the remote unit 105 use any PUCCH resource for SR transmission on the current active BWP (e.g., resources configured for a different LCH).

In certain embodiments, the remote unit 105 avoids transmitting a PRACH transmission and a SR procedure on (dedicated) PUCCH in the same subframe/slot. Instead, the remote unit 105 delays the PRACH transmission to the next PRACH occasion upon detecting that the RACH procedure runs in parallel to the dedicated SR procedure on PUCCH, resulting in PUCCH and PRACH being scheduled for the same subframe/slot. Beneficially, this avoids transmission collisions between the PRACH and the SR on PUCCH. Moreover, delaying the PRACH transmission to the next PRACH occasion improves preamble detection by ensuring the preamble power is kept constant during each transmission.

Where the two transmissions overlap in time, it may be challenging for the power amplifier in the remote unit 105 to keep the preamble power constant while simultaneously transmitting both the PRACH and the PUCCH, due to the different physical channels having different UL timing and, possibly, different transmission duration. However, in certain embodiments, the remote unit 105 may be configured to predict future UL channel transmissions, thus enabling simultaneous transmission of PRACH and PUCCH with constant preamble transmission power. This alternative reduces SR latency for LCHs having no dedicated PUCCH resources in the current active BWP, at the expense of additional UE power control complexity.

Figure 2:
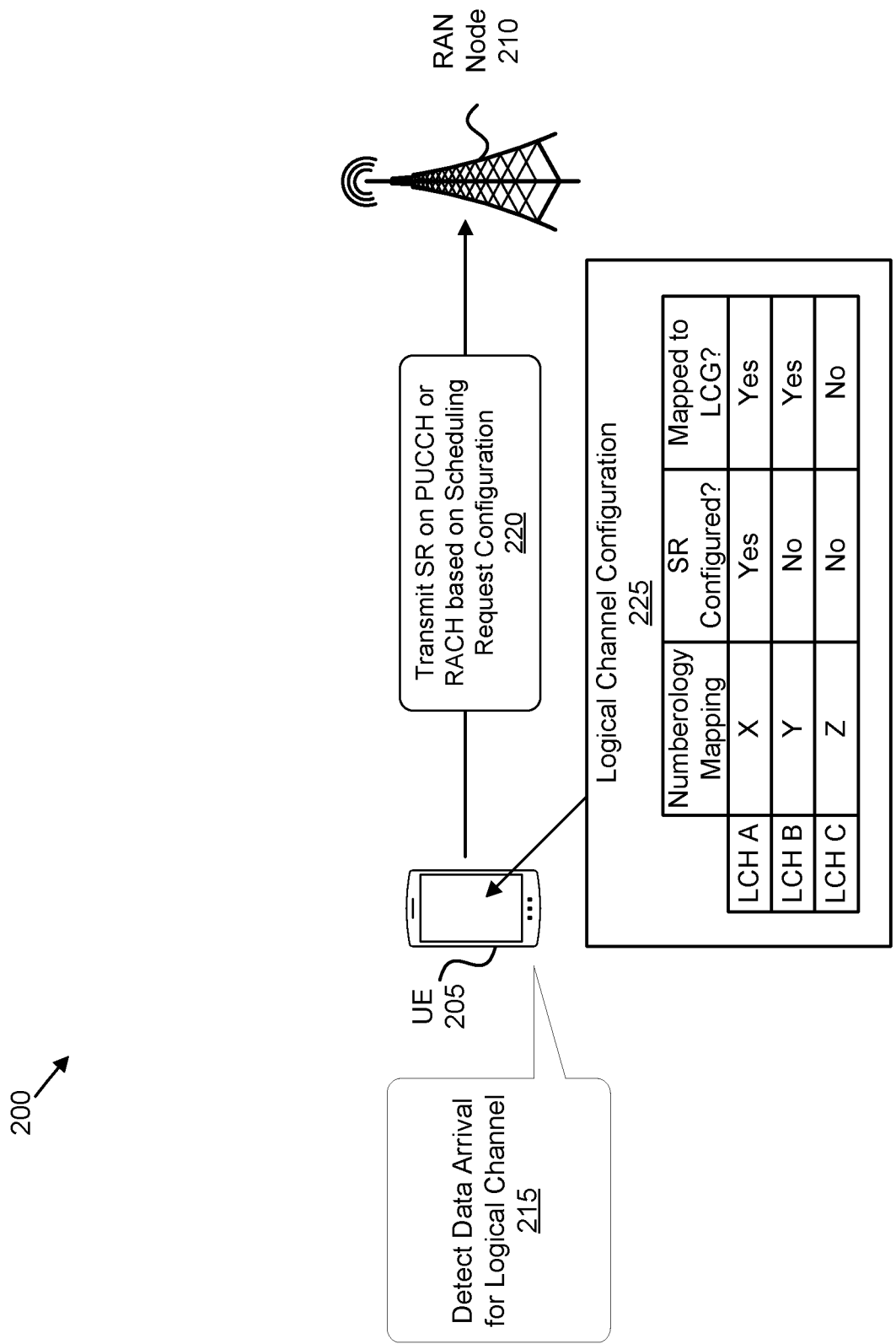
FIG. 2 is a block diagram illustrating one embodiment of a procedure for efficiently transmitting a scheduling request.

FIG. 2 depicts a network 200 used for efficiently transmitting a SR, according to embodiments of the disclosure. The network 200 includes a UE 205 and a RAN node 210. The network 200 depicts a simplified embodiment of the wireless communication system 100. The UE 205 may be one embodiment of the remote unit 105, while the RAN node 210 may be one embodiment of the base unit 110. In various embodiments, the RAN node 210 is a gNB or other 5G-RAN base station. Although only one UE 205 is depicted, in other embodiments the RAN node 210 may serve a plurality of UEs 205.

As depicted, the UE 205 supports multiple LCHs (ICH A', ICH B' and ICH C'), each mapped to different numerology ('X', 'Y', and 'Z'). Here, LCH A is configured for SR (e.g., LCH A has PUCCH resources dedicated for SR), while LCH B and LCH C are not configured for SR. Additionally, LCH A and LCH B are mapped to a logical cell group ("LCG") for the purpose of buffer status reporting), while LCH C is not mapped to a LCG. The above information is for example included in the LCH configuration 225.

In case data arrival for LCH A (see, e.g., block 215) triggers a BSR, the UE 205 transmits a SR signal via PUCCH (see, e.g., block 220) due to LCH A having a SR configuration. However, in case data arrival for LCH B (see, e.g., block 215) triggers a BSR, the UE 205 initiates a RACH procedure since LCH B has no corresponding SR configuration. More specifically, the data arrival for LCH B may trigger the BSR and the UE 205 further triggers a SR ("SR") for LCH B based on the triggered BSR. The UE 205 determines that LCH B has no corresponding SR configuration (e.g., determines that LCH B is not configured with PUCCH resources for transmission of a SR signal) and thus initiates the RACH procedure via PRACH transmission (see, e.g., block 220). Similarly, data arrival for LCH C may trigger a RACH procedure, as described above, due to LCH C not being configured with PUCCH resources for transmission of a SR signal.

In the RACH procedure, the UE 205 communicates its SR via PRACH transmission (see, e.g., block 220). However, if subsequently a second BSR or SR is triggered, e.g., due to data arrival of LCH A, then the UE 205 may perform dedicated SR procedure on PUCCH in parallel to the RACH Procedure. Note that for LCH A, the pending SR is transmitted on a valid PUCCH resource of the associated SR configuration. In various embodiments, the UE 205 is only configured to (or capable of) performing one RACH procedure at a time. Thus, a BSR triggered for LCH C would not result in initiation of a second RACH procedure.

In various embodiments, the UE 205 multiplexes a BSR in the RACH message 3. In certain embodiments, upon the multiplexing/transmission of a BSR MAC Control Element ("CE") in RACH message 3 (when RACH procedure has been triggered for the purpose of UL SR, e.g., due to the LCH having no associated SR configuration) which contains buffer status up to (and including) the last event that triggered a BSR, the UE 205 cancels the pending SR which triggered the RACH procedure, but does not cancel other pending SRs. Furthermore, each respective SR-Prohibit-Timer is not to be stopped. Because the RACH message 3 may be subject to Hybrid Automatic Repeat Request ("HARQ") retransmissions which will take some time, it is beneficial to not cancel other pending SRs.

For the case that PRACH transmission (e.g., triggered by LCH B) overlaps in time with SR transmission on PUCCH (triggered by LCH A), then the UE 205 transmits according to above described embodiment the SR on PUCCH (see block 220) and may optionally postpone the PRACH transmission until the next available PRACH resource. Because LCH B is not mapped to an SR configuration, the assumption is that LCH B doesn't carry latency-critical data. Hence, postponing the PRACH transmission is assumed to not have a significant (negative) impact on the performance of the service supported by LCH B.

Figure 3:
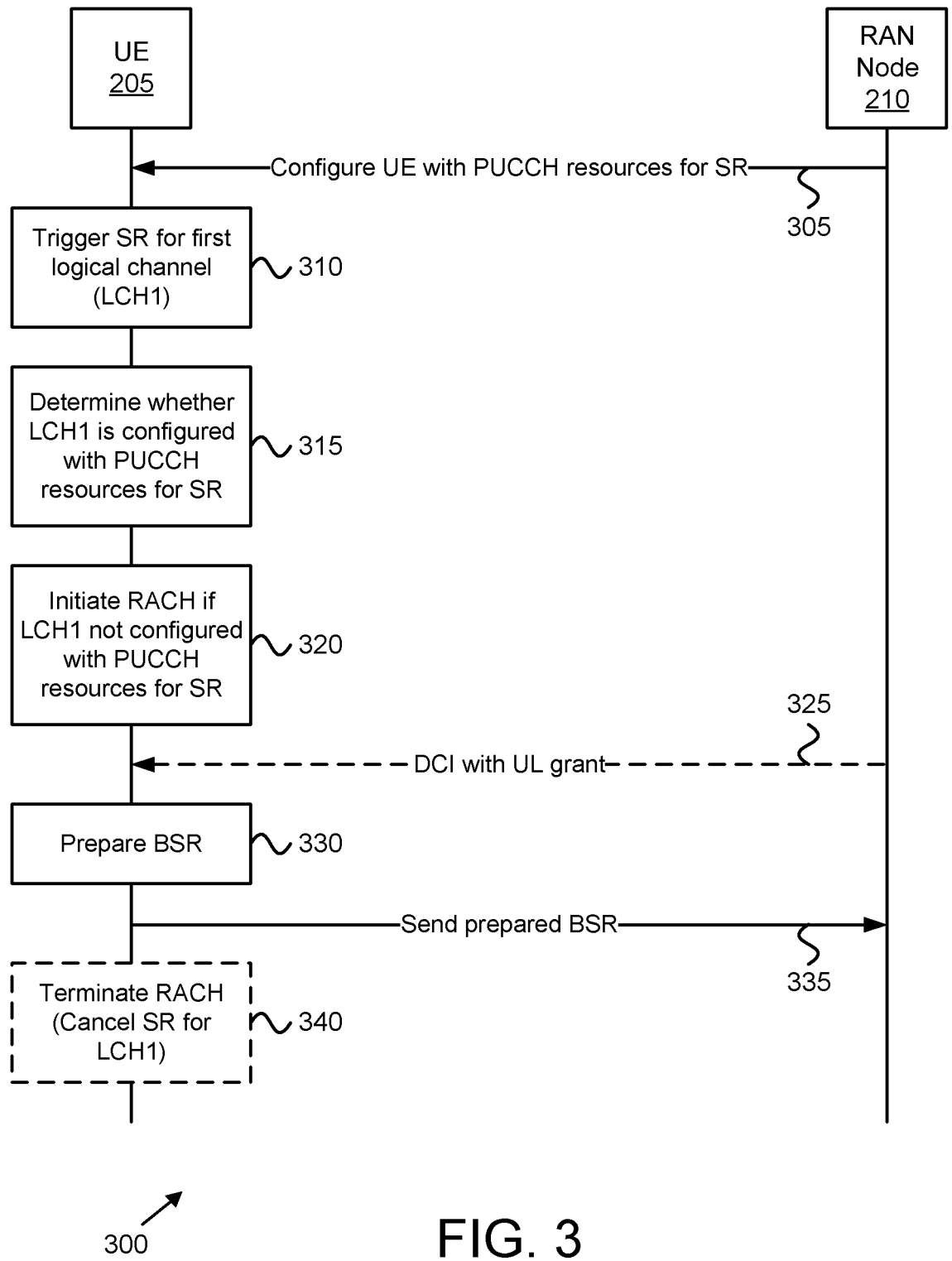
FIG. 3 is a block diagram illustrating another procedure for efficiently transmitting a scheduling request.

FIG. 3 depicts a network procedure 300 for efficiently transmitting a SR, according to embodiments of the disclosure. The network procedure 300 involves the UE 205 and the RAN node 210. The RAN node 210 configures the UE 205 with PUCCH resources for SR (see messaging 305). SR configuration is discussed above with reference to FIG. 2.

At a later point in time, the UE 205 triggers a SR for a first LCH (denoted "LCH1") (see block 310). In certain embodiments, the UE 205 triggers the SR in response to data arrival triggering a buffer status report for LCH1.

In response to the triggered SR, the UE 205 determines whether LCH1 is configured with PUCCH resources for SR (see block 315). Here, the UE 205 may examine the SR configuration (e.g., received in messaging 305) to determine whether LCH1 is configured with PUCCH resources for SR. In the embodiment of FIG. 3, it is assumed the LCH1 is not configured with PUCCH resources for SR.

Because LCH1 is not configured with PUCCH resources for SR, the UE 205 initiates RACH procedure to request UL resources for LCH1 (see block 320). In various embodiments, the RACH procedure is a 4-step procedure with the UE 205 transmitting a RACH preamble ("message 1", also referred to as RACH Request) and the RAN Node transmitting a Random-access response ("RAR") message (also referred to as "message 2"). The RAR message includes an UL grant for a Layer-2 and/or Layer-3 ("L2/L3") message (e.g., RRC connection request, Buffer status report MAC CE). The UE 205 sends the RACH message 3 on resources indicated in the UL grant. The RAN node 210 then sends a contention resolution message (RACH message 4).

In certain embodiments, the UE 205 may receive UL grant not associated with the RACH procedure (e.g., the UL grant is not in a RACH message 2, see messaging 325). Using the example of FIG. 2, while the RACH procedure is ongoing for LCH B (e.g., for LCH1), the UE 205 may receive an UL grant in response to a SR signal transmitted on PUCCH resources for LCH A. In response to the UL grant, the UE 205 prepares a BSR with a current buffer status (see block 330) and also transmits the BSR (see messaging 335). If the BSR indicates the buffer status up to (and including) the last event that triggered a BSR, then the UE 205 terminates the RACH procedure (see block 340) as there is no longer a needed as the network (e.g., RAN node 210) is already informed of the current buffer status of the UE (including the data/buffer of LCH1).

In some embodiments, the UE 205 may stop an ongoing RACH procedure which was triggered due to an pending SR (e.g., due to data arrival for a LCH which is not mapped to an SR configuration), if the UE 205 receives an UL grant addressed to the C-RNTI (e.g., in response to the transmission of an SR on PUCCH) and assembles (and transmits) a MAC PDU which includes a BSR that contains buffer status up to (and including) the last event that triggered a BSR. Accordingly, the ongoing RACH procedure is no longer needed due to transmission of the BSR (in the UL grant addressed to the C-RNTI).

Figure 4:
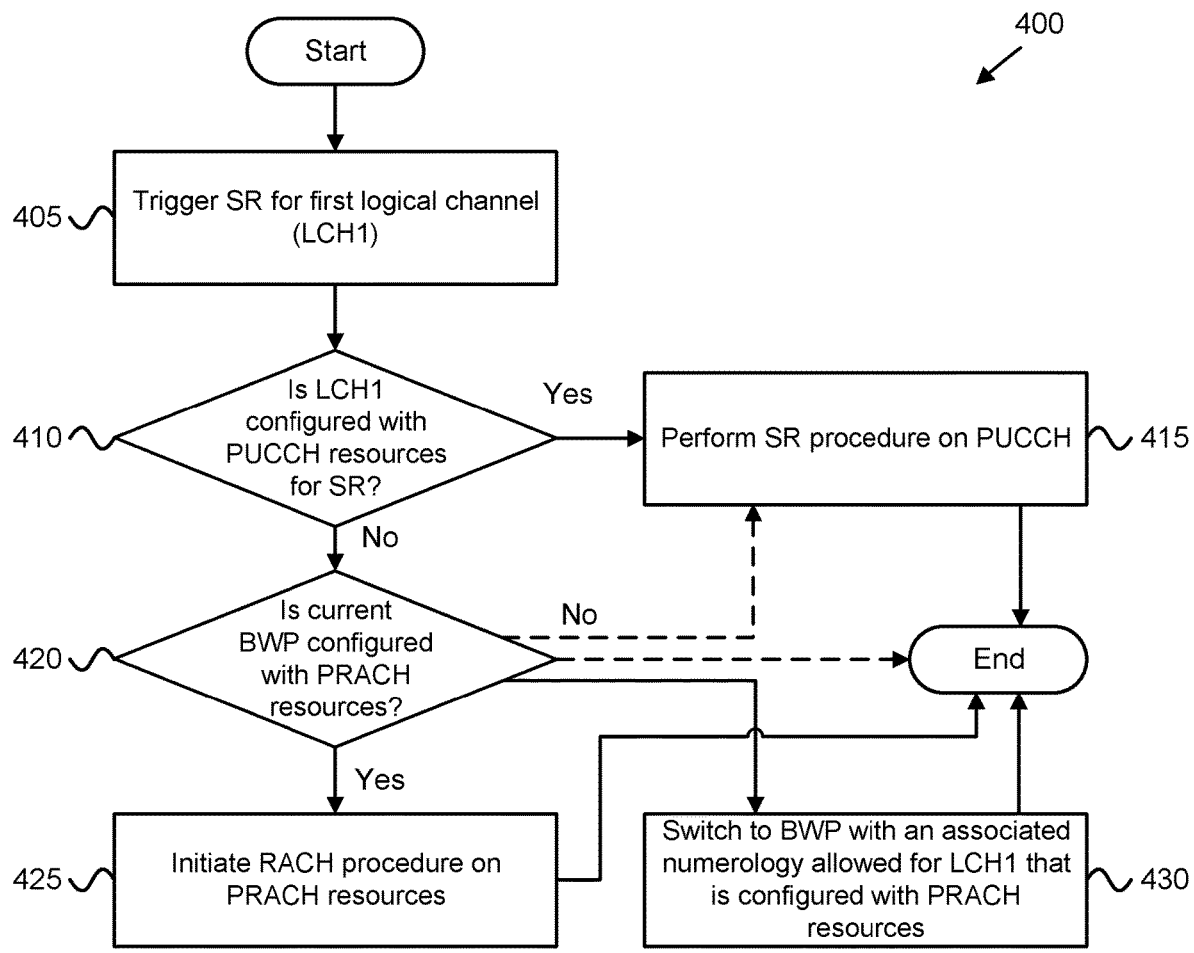
FIG. 4 is a block diagram illustrating third procedure for efficiently transmitting a scheduling request.

FIG. 4 depicts a flowchart of a procedure 400 for efficiently transmitting a SR, according to embodiments of the disclosure. The procedure 400 may be performed by the UE 205. The procedure 400 begins and the UE 205 triggers 405 SR for a first LCH (LCH1). The UE 205 then determines 410 whether LCH1 is configured with PUCCH resources for SR. If the LCH1 is configured with PUCCH resources for SR (e.g., LCH1 is "configured with SR"), then the UE 205 performs 415 SR procedure on PUCCH (e.g., sending a SR signal on PUCCH resources configured for LCH1).

Otherwise, if LCH1 is not configured with PUCCH resources for SR (e.g., LCH1 is not "configured with SR"), then the UE 205 determines 420 whether a current active UL/DL BWP is configured with PRACH resources. If the current active UL/DL BWP is configured with PRACH resources, then the UE 205 initiates 425 a RACH procedure for LCH1 using the PRACH resources. Otherwise, if the current active UL/DL BWP is not configured with PRACH resources, then the UE 205 may perform one of the following:

In some embodiments, the UE 205 switches 430 to an UL/DL BWP with an associated numerology (e.g., associated subcarrier spacing ("SCS")) which is an allowed numerology/SCS for the LCH which triggered the BSR/RACH procedure. Here, the BWP switch may be performed upon initiation of the RACH procedure due to the triggered BSR/SR. Note that a current UL BWP for the UE 205 may not be configured with PRACH resources. In such embodiments, the UE 205 needs to switch to a UL BWP configured PRACH resources in order to send RACH messages. Here, the switched-to BWP is configured with PRACH resources for the triggering LCH and has an associated numerology (e.g., associated subcarrier spacing, "SCS") which is an allowed numerology/SCS for the LCH.

In one embodiment, the UE 205 switches to the initial DL/UL BWP for the case that RACH procedure is initiated when the active UL BWP has no configured PRACH resources. As used herein, the "initial BWP" refers to the first BWP assigned to the UE 205 upon connecting to the RAN. However, in certain embodiments the initial DL/UL BWP may not have an associated numerology/SCS which is matching with the numerology(ies)/SCS(s) allowed for the LCH which triggered the RACH procedure (e.g., due to missing SR configuration). Therefore, by switching to an UL/DL BWP with a numerology/SCS that is supported by the LCH which triggered the RACH procedure, the RAN node 210 is provided with the information on the supported numerology/SCS.

In one embodiment, the UE 205 initiates 425 a RACH procedure for a LCH which has no associated SR configuration only in the case where the current active UL BWP has configured PRACH resources. However, if SR is triggered for a LCH which has no associated SR configuration and the current active UL BWP has no PRACH resources, then the UE 205 may use any of the SR configurations associated with its LCHs and current BWP for transmission 415 of SR on PUCCH. Alternatively, if the current active UL BWP has no PRACH resources, then the UE 205 does not switch to a different UL/DL BWP, e.g., initial UL/DL BWP, and initiate a RACH procedure, but keeps the SR pending until cancelled.

Figure 5:
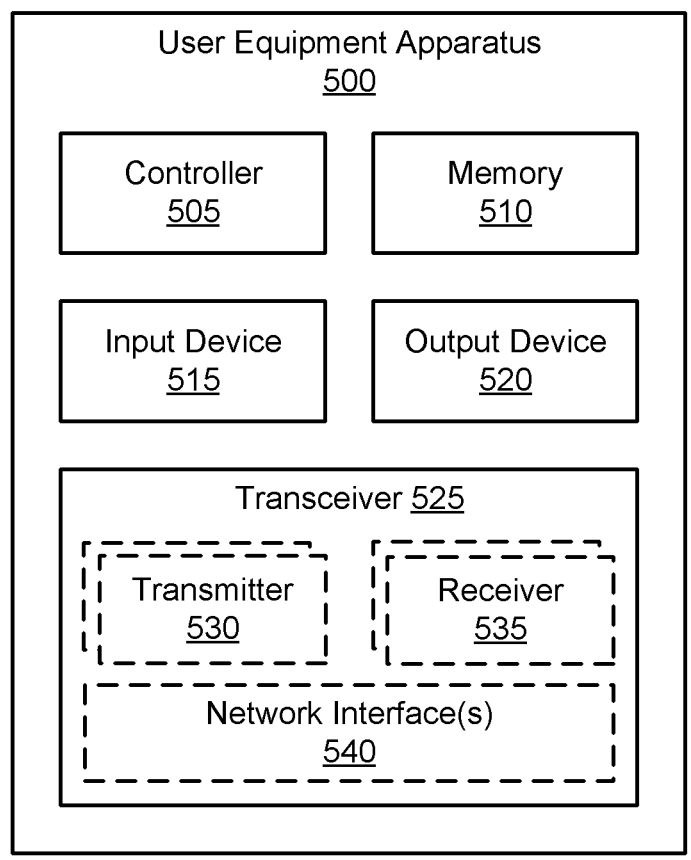
FIG. 5 is a block diagram illustrating one embodiment of a user equipment apparatus that may be used for efficiently transmitting a scheduling request.

FIG. 5 depicts one embodiment of a user equipment apparatus 500 that may be used for efficiently transmitting a SR. The user equipment apparatus 500 may be one embodiment of the remote unit 105. Furthermore, the user equipment apparatus 500 may include a processor 505, a memory 510, an input device 515, an output device 520, and a transceiver 525. In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of the processor 505, the memory 510, and the transceiver 525, and may not include the input device 515 and/or the output device 520.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 initiates a RACH procedure for an UL SR in response to a triggered SR and receives (e.g., via transceiver 525) an UL grant while the RACH procedure is ongoing. The processor 505 prepares a BSR indicating a current buffer status and terminates the RACH procedure in response to transmitting the BSR (e.g., via the transceiver 525).

In various embodiments, preparing the BSR includes assembling a MAC PDU containing the BSR. In such embodiments, the processor 505 controls the transceiver 525 to transmit the MAC PDU on an UL resource corresponding to the UL grant. Additionally, the BSR indicates the buffer status up to the last event that triggered a BSR prior to the MAC PDU assembly.

In some embodiments, the processor 505 initiates the RACH procedure due to a pending SR for a LCH that is not configured with PUCCH resources for transmission of a SR signal. In certain embodiments, terminating the RACH procedure includes the processor 505 cancelling the triggered SR. In certain embodiments, terminating the RACH procedure includes the processor 505 canceling the RACH procedure without canceling (e.g., while maintaining) one or more additional pending SRs.

In some embodiments, the UL grant is not received as part of a RACH procedure. In certain embodiments, the UL grant is addressed to a C-RNTI belonging to the remote unit. In some embodiments, the received UL grant is a response to a second SR for a LCH that is configured with PUCCH resources for transmission of a SR signal.

In various embodiments, the processor 505 triggers a BSR in response to arrival of data for a first LCH and triggers a SR for the first LCH based on the triggered BSR. The processor 505 determines whether the first LCH is configured with PUCCH resources for transmission of a SR signal. In response to the first LCH not being configured with PUCCH resources for transmission of a SR signal, the processor 505 initiates a RACH procedure for requesting UL resources for the first LCH.

In some embodiments, the transceiver 525 receives (e.g., via the transceiver 525) an UL grant while the RACH procedure is ongoing. Here, the processor 505 transmits (e.g., via the transceiver 525) the BSR on resources corresponding to the received UL grant and terminating the RACH procedure in response to receiving the UL grant. In such embodiments, terminating the RACH procedure may include canceling the RACH procedure without canceling (e.g., while maintaining) one or more additional pending SRs.

In certain embodiments, the processor 505 uses a SR configuration of a current active BWP to determine whether the first LCH is configured with PUCCH resources for transmission of a SR signal.

In some embodiments, the processor 505 detects data arrival for a second LCH while requesting UL resources using the RACH procedure is ongoing and determining that there are PUCCH resources for transmission of a SR signal based on the SR configuration of the second LCH. Here, the processor 505 also determines whether a transmission of a RACH preamble and transmission of the PUCCH resources for transmission of a SR signal are scheduled to overlap in time. In response to the transmissions being scheduled to overlap in time, the processor 505 postpones the RACH preamble transmission.

In certain embodiments, initiating the RACH procedure includes the processor 505 determining whether a current active BWP is configured with RACH resources. In such embodiments, in response to the current active BWP not being configured with RACH resources, the processor 505 may switch to a second BWP configured with RACH resources and supporting a SCS allowed for the first LCH. Here, the second BWP is different than an initial BWP, the initial BWP being a first BWP assigned to the remote unit upon connecting to a mobile communication network.

In some embodiments, the processor 505 switches an UL/DL BWP from a first BWP to a second BWP in response to triggering a RACH procedure. Here, the second BWP supports the numerology associated with the first LCH while the first BWP does not support the numerology associated with the first LCH.

In some embodiments, the processor 505 determines whether a current active BWP is configured with RACH resources. Here, in response to the current active BWP not being configured with RACH resources, the processor 505 suspends the RACH procedure. In such embodiments, the processor 505 resumes the RACH procedure in response to detecting a change to the current active BWP, where the change results in the current active BWP being configured with RACH resources.

In some embodiments, the processor 505 determines whether a current active BWP is configured with RACH resources. Here, in response to the current active BWP not being configured with RACH resources, the processor 505 terminates the RACH procedure. In certain embodiments, the processor 505 may transmit (via transceiver 525) a SR for the first LCH on an UL control channel resource configured for a second LCH in response to the current active BWP not being configured with RACH resources.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to efficiently transmitting a SR. For example, the memory 510 may store buffer status, SR configuration, PRACH configuration, and the like. In certain embodiments, the memory 510 also stores program code and related data, such as an operating system or other controller algorithms operating on the user equipment apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, a liquid crystal display ("LCD"), a light-emitting diode ("LED") display, an organic LDE ("OLED") display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to communicate with a RAN node, such as the base unit 110. Although a specific number of transmitter(s) 530 and receiver(s) 535 are illustrated, the user equipment apparatus 500 may have any suitable number of transmitters 530 and receivers 535. Moreover, the transceiver 525 may support one or more network interfaces 540, for example a 'Uu' interface with a RAN node, a 'N1' interface with an AMF, among other interfaces.

Figure 6:
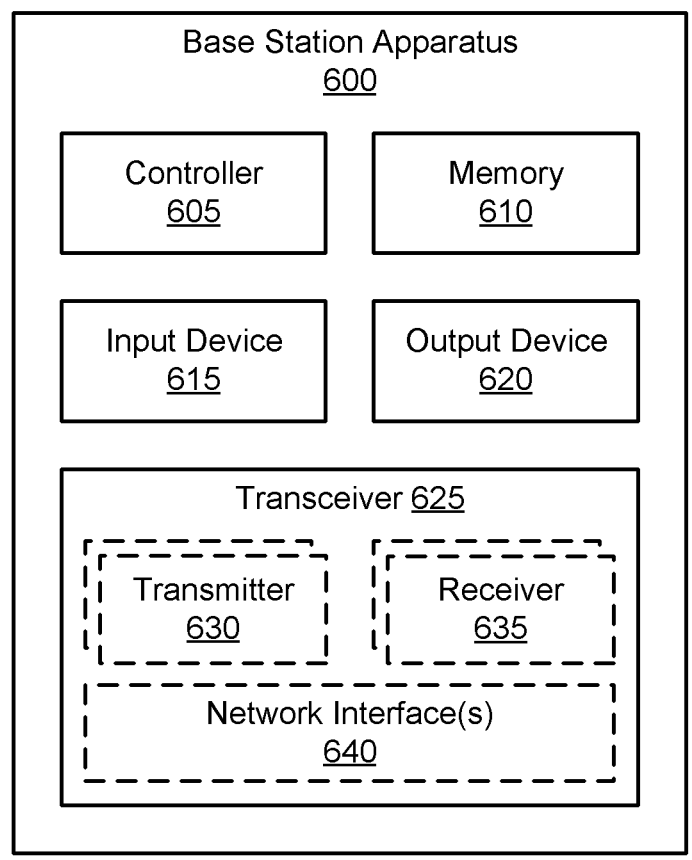
FIG. 6 is a block diagram illustrating one embodiment of a Radio Access Network ("RAN") node apparatus that may be used for efficiently transmitting a scheduling request.

FIG. 6 depicts one embodiment of a base station apparatus 600 that may be used for efficiently transmitting a SR, according to embodiments of the disclosure. The base station apparatus 600 may be one embodiment of the base unit 110 and/or RAN node 210, described above. Furthermore, the base station apparatus 600 may include a processor 605, a memory 610, an input device 615, an output device 620, a transceiver 625 for communicating with one or more remote units 105 and/or a mobile core network 140.

As depicted, the transceiver 625 may include a transmitter 630 and a receiver 635. The transceiver 625 may also support one or more network interfaces 640, such as the Uu interface, N2 interface, N3 interface, and/or other network interfaces suitable for communication with a remote unit and/or core network. In some embodiments, the input device 615 and the output device 620 are combined into a single device, such as a touchscreen. In certain embodiments, the base station apparatus 600 may not include any input device 615 and/or output device 620.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In some embodiments, the processor 605 controls the transceiver 625 to receive a signaling request from a remote unit, such as the remote unit 105 and/or the UE 205. In various embodiments, the signaling request may be transmitted over PUCCH. For example, if the remote unit is configured with (dedicated) PUCCH resources for particular LCH and data arrives for said LCH, then the remote unit transmits (and the transceiver 625 receives) the signaling request on the PUCCH at resources. However, if the remote unit is not configured with (dedicated) PUCCH resources for the LCH for which data arrives, then the remote unit transmits (and the transceiver 625 receives) the signaling request on either a PRACH resource or a different PUCCH resource, as described herein. The processor 605 may respond to the SR (e.g., received via PUCCH or PRACH) with an UL grant. In response to receiving a BSR, the processor 605 may allocate the remote unit 105 with PUSCH resources.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data relating to efficiently transmitting a SR. For example, the memory 610 may store scheduling data, UL data, remote unit (UE) identities, and the like. In some embodiments, the memory 610 also stores program code and related data, such as an operating system or other controller algorithms operating on the remote unit 105 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes two or more different devices, such as a keyboard and a touch panel. In certain embodiments, the input device 615 may include a camera for capturing images or otherwise inputting visual data.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with remote unit within a mobile communication network. The transceiver 625 may also communicate with a core network, such as the mobile core network 140. The transceiver 625 may include one or more transmitters 630 and one or more receivers 635. As discussed above, the transceiver 625 may support one or more the network interface 640 for communicating with remote units 105 and the mobile core network 140.

Figure 7:
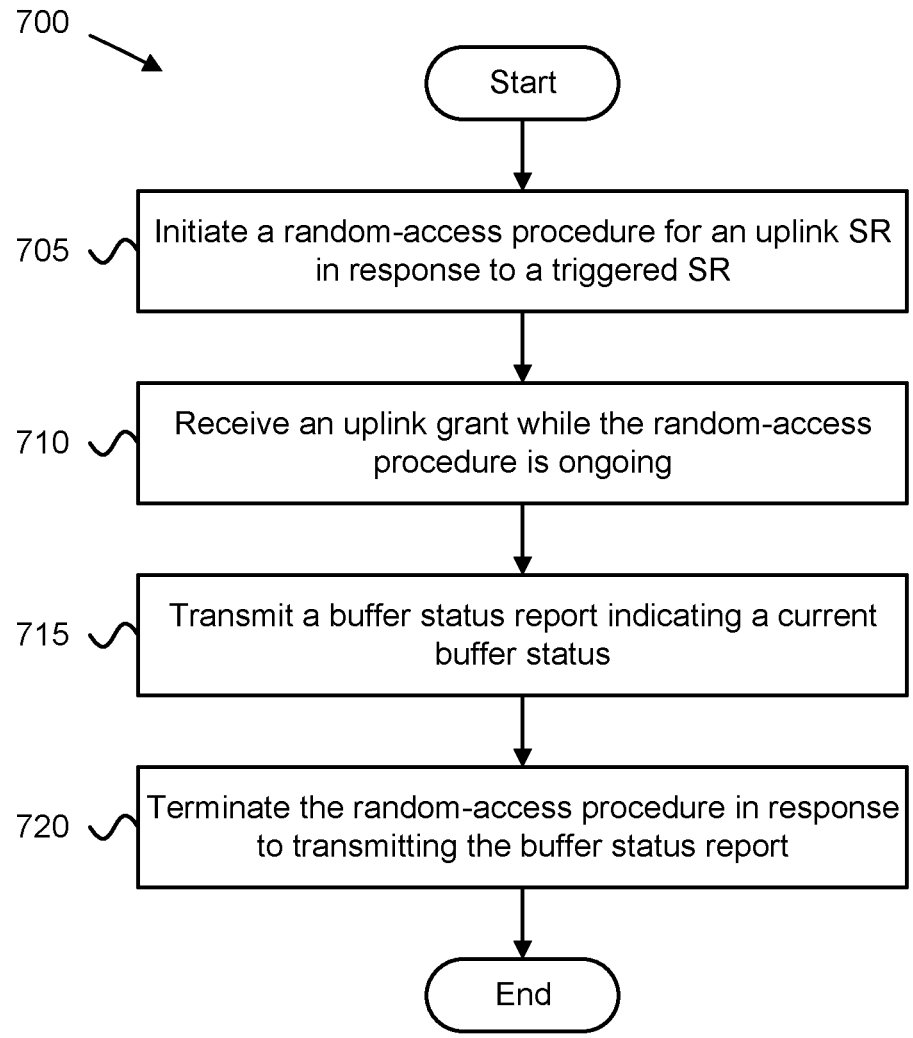
FIG. 7 is a schematic block diagram illustrating a first embodiment of a method for efficiently transmitting a scheduling request.

FIG. 7 depicts a method 700 for efficiently transmitting a SR, according to embodiments of the disclosure. In some embodiments, the method 700 is performed by an apparatus, such as the remote unit 105, the UE 205, and/or the user equipment apparatus 500. In certain embodiments, the method 700 may be performed by a processor executing program code, for example, a microcontroller, a microprocessor, a CPU, a GPU, an auxiliary processing unit, a FPGA, or the like.

The method 700 begins and initiates 705 a RACH procedure for an UL SR in response to a triggered SR. In some embodiments, initiating 705 the RACH procedure is triggered due to a pending SR for a LCH that is not configured with PUCCH resources for transmission of a SR signal.

The method 700 includes receiving 710 an UL grant while the RACH procedure is ongoing. In certain embodiments, the UL grant is not received as part of a RACH procedure. In certain embodiments, the UL grant is addressed to a C-RNTI belonging to the remote unit. In certain embodiments, the received UL grant is a response to a second SR for a LCH that is configured with PUCCH resources for transmission of a SR signal.

The method 700 includes transmitting 715 a buffer status report indicating a current buffer status. In certain embodiments, the buffer status report is transmitted 715 in a MAC PDU on an UL resource corresponding to the UL grant, wherein the buffer status report indicates the buffer status up to the last event that triggered a buffer status report prior to the MAC PDU assembly.

The method 700 includes terminating 720 the RACH procedure in response to transmitting the buffer status report. The method 700 ends. In certain embodiments, terminating 720 the RACH procedure includes cancelling the triggered SR. In further embodiments, terminating 720 the RACH procedure includes canceling the RACH procedure without canceling one or more additional pending SRs.

Figure 8:
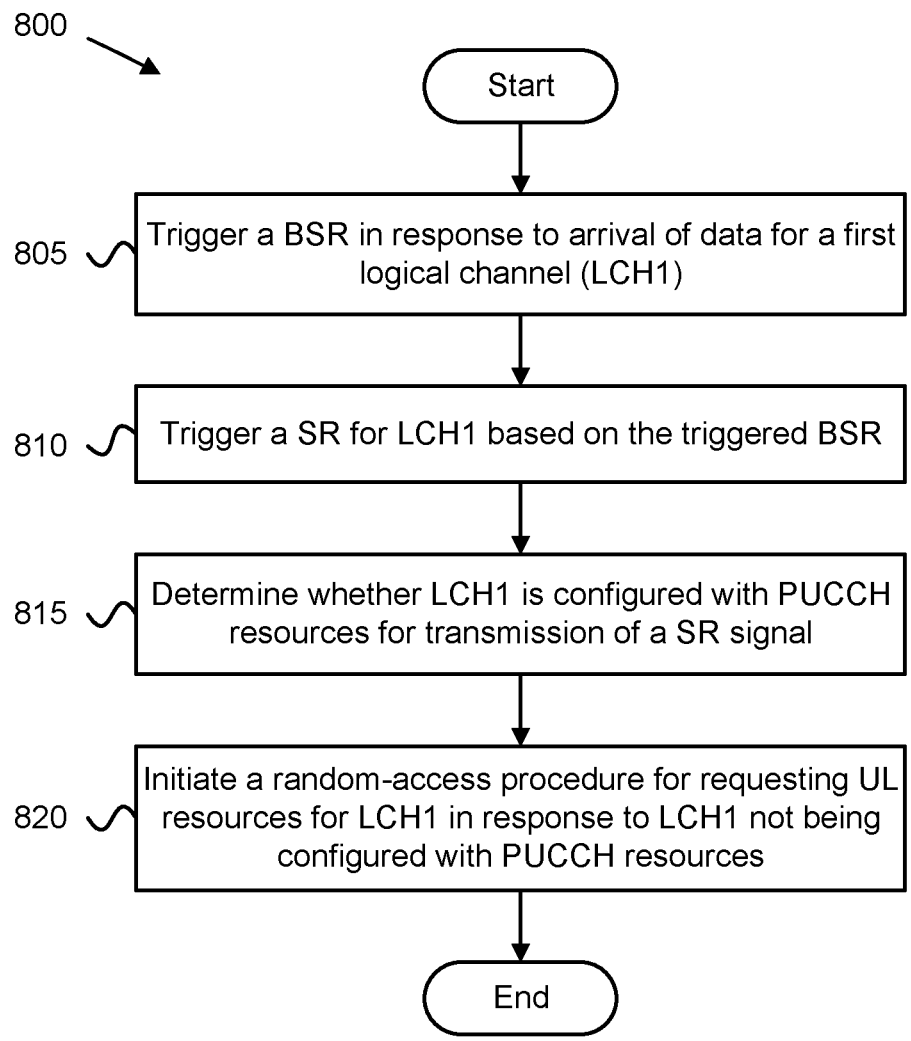
FIG. 8 is a schematic block diagram illustrating a second embodiment of a method be used for efficiently transmitting a scheduling request.

FIG. 8 depicts a method 800 for efficiently transmitting a SR, according to embodiments of the disclosure. In some embodiments, the method 800 is performed by an apparatus, such as the remote unit 105, the UE 205, and/or the user equipment apparatus 500. In certain embodiments, the method 800 may be performed by a processor executing program code, for example, a microcontroller, a microprocessor, a CPU, a GPU, an auxiliary processing unit, a FPGA, or the like.

The method 800 begins and triggers 805 a buffer status report in response to arrival of data for a first LCH and triggers 810 a SR for the first LCH based on the triggered buffer status report.

The method 800 includes determining 815 whether the first LCH is configured with PUCCH resources for transmission of a SR signal. In certain embodiments of the second method, determining 815 whether the first LCH is configured with PUCCH resources for transmission of a SR signal is based on a SR configuration of a current active BWP.

The method 800 includes initiating 820 a RACH procedure for requesting UL resources for the first LCH in response to the first LCH not being configured with PUCCH resources for transmission of a SR signal. In certain embodiments, initiating 820 the RACH procedure includes postponing a RACH preamble transmission in response to transmission of a RACH preamble and transmission of a SR signal (e.g., on PUCCH resources configured for SR) being scheduled to overlap in time. Here, the transmission of a SR signal is due to data arrival for a second LCH configured with PUCCH resources for transmission of the SR signal.

In certain embodiments of the second method, initiating 820 the RACH procedure includes determining whether a current active BWP is configured with random access channel resources and switching to a BWP configured with random access channel resources and supporting a subcarrier spacing allowed for the first LCH, in response to the current active BWP not being configured with random access channel resources. In such embodiments, the current active BWP configured with random access channel resources and supporting a subcarrier spacing allowed for the first LCH is different than an initial BWP, the initial BWP being a first BWP assigned to the remote unit upon connecting to a mobile communication network.

Figure 9:
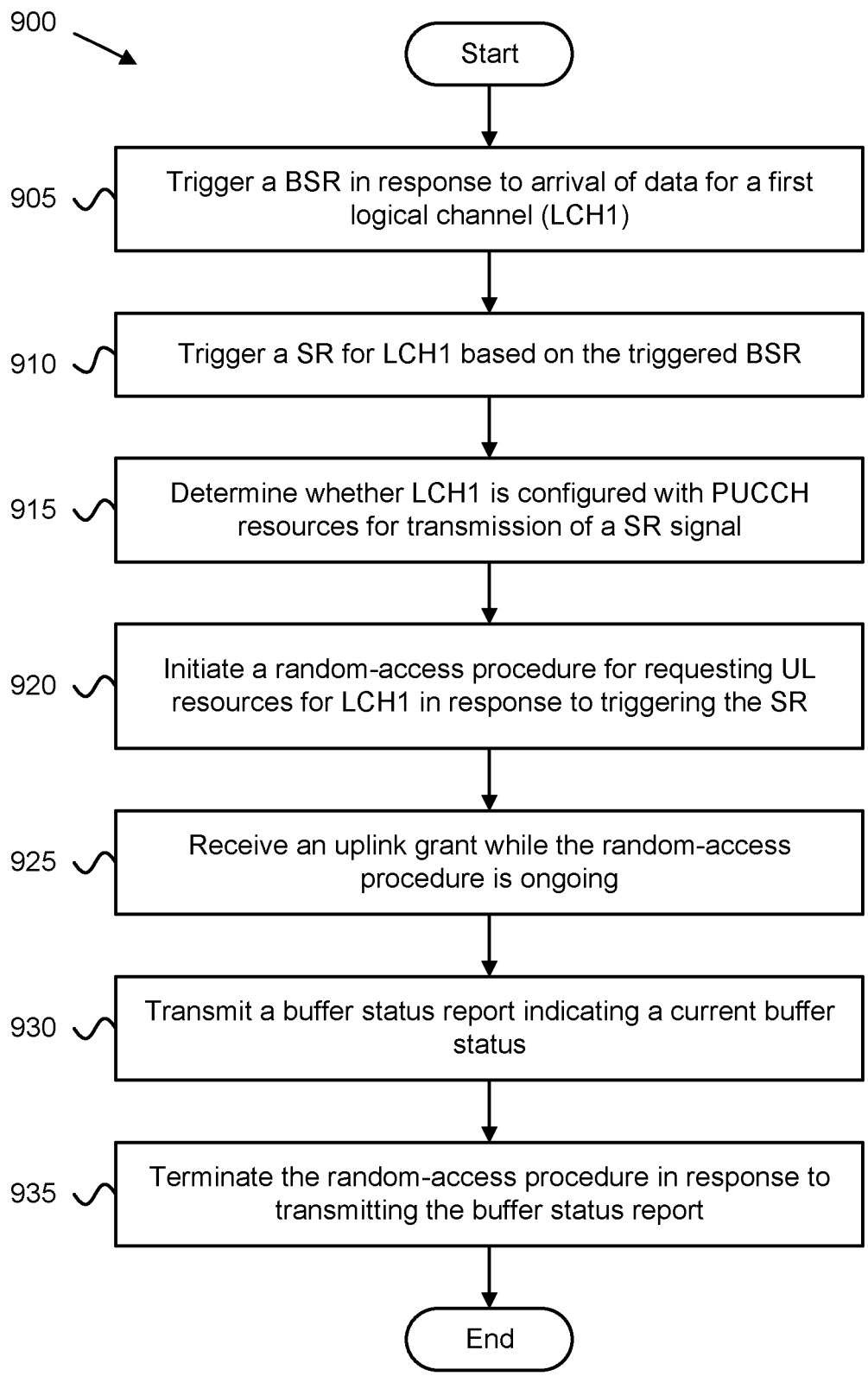
FIG. 9 is a schematic block diagram illustrating a third embodiment of a method for efficiently transmitting a scheduling request.

FIG. 9 depicts a method 900 for efficiently transmitting a SR, according to embodiments of the disclosure. In some embodiments, the method 900 is performed by an apparatus, such as the remote unit 105, the UE 205, and/or the user equipment apparatus 500. In certain embodiments, the method 900 may be performed by a processor executing program code, for example, a microcontroller, a microprocessor, a CPU, a GPU, an auxiliary processing unit, a FPGA, or the like.

The method 900 begins and triggers 905 a buffer status report in response to arrival of data for a first LCH and triggering 910 a SR for the first LCH based on the buffer status report.

The method 900 includes determining 915 whether the first LCH is configured with PUCCH resources for transmission of a SR signal. In certain embodiments of the second method, determining 915 whether the first LCH is configured with PUCCH resources for transmission of a SR signal is based on a SR configuration of a current active BWP.

The method 900 includes initiating 920 a RACH procedure for requesting UL resources for the first LCH in response to triggering the SR. In certain embodiments, initiating 920 the RACH procedure includes postponing a RACH preamble transmission in response to transmission of a RACH preamble and transmission of a SR signal (e.g., on PUCCH resources configured for SR) being scheduled to overlap in time. Here, the transmission of a SR signal is due to data arrival for a second LCH configured with PUCCH resources for transmission of the SR signal.

In certain embodiments of the second method, initiating 920 the RACH procedure includes determining whether a current active BWP is configured with random access channel resources and switching to a BWP configured with random access channel resources and supporting a subcarrier spacing allowed for the first LCH, in response to the current active BWP not being configured with random access channel resources. In such embodiments, the current active BWP configured with random access channel resources and supporting a subcarrier spacing allowed for the first LCH is different than an initial BWP, the initial BWP being a first BWP assigned to the remote unit upon connecting to a mobile communication network.

The method 900 includes receiving 925 an UL grant while the RACH procedure is ongoing. In certain embodiments, the UL grant is not received as part of a RACH procedure. In certain embodiments, the UL grant is addressed to a C-RNTI belonging to the remote unit. In certain embodiments, the received UL grant is a response to a second SR for a LCH that is configured with PUCCH resources for transmission of a SR signal.

The method 900 includes transmitting 930 the buffer status report indicating a current buffer status. In certain embodiments, the buffer status report is transmitted 930 in a MAC PDU on an UL resource corresponding to the UL grant, wherein the buffer status report indicates the buffer status up to the last event that triggered a buffer status report prior to the MAC PDU assembly.

The method 900 includes terminating 935 the RACH procedure in response to transmitting the buffer status report. In certain embodiments, terminating 935 the RACH procedure includes cancelling the triggered SR. In further embodiments, terminating 935 the RACH procedure includes canceling the RACH procedure without canceling one or more additional pending SRs.

Figure 10:
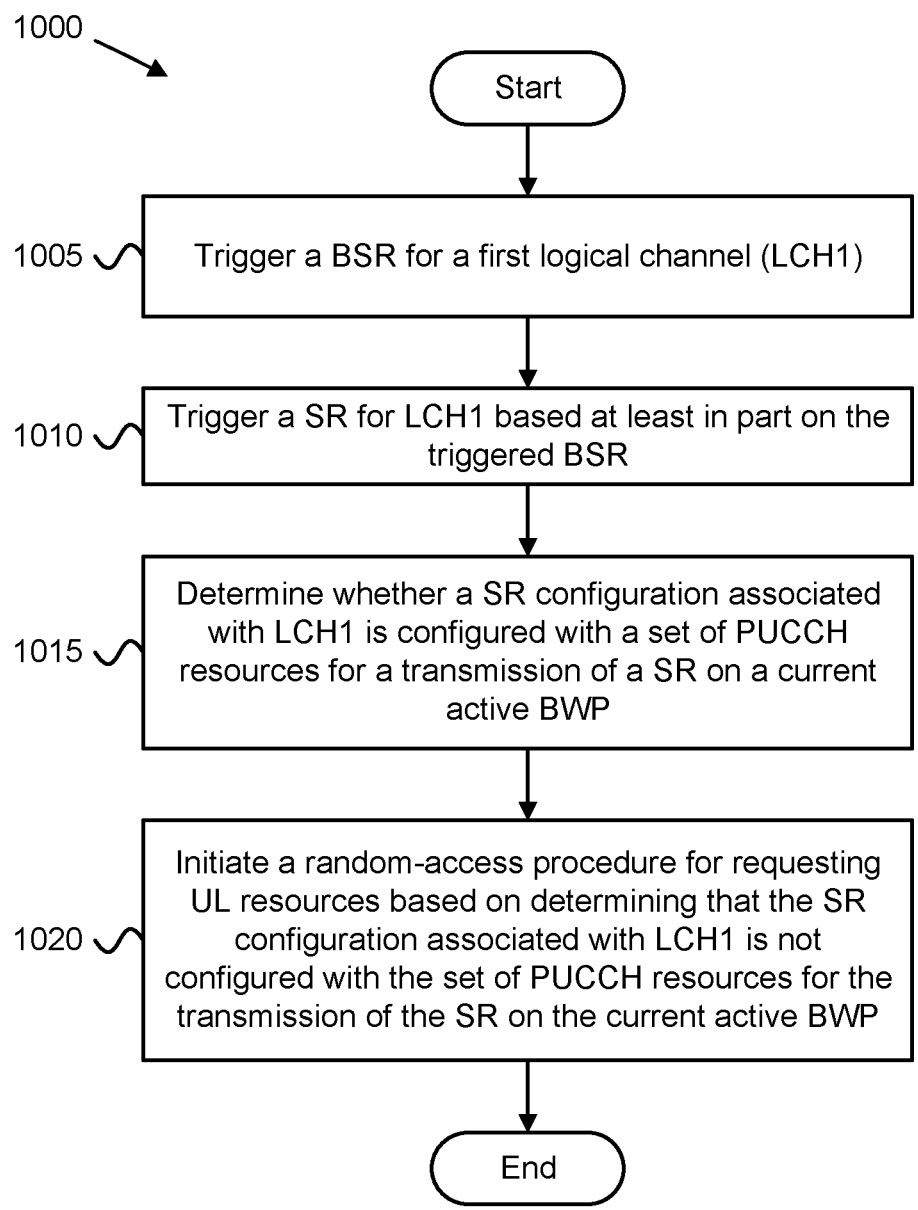
FIG. 10 is a block diagram illustrating a fourth embodiment of a method for efficiently transmitting a scheduling request.

FIG. 10 depicts a method 1000 for efficiently transmitting a SR, according to embodiments of the disclosure. In some embodiments, the method 1000 is performed by an apparatus, such as the remote unit 105, the UE 205, and/or the user equipment apparatus 500. In certain embodiments, the method 1000 may be performed by a processor executing program code, for example, a microcontroller, a microprocessor, a CPU, a GPU, an auxiliary processing unit, a FPGA, or the like.

The method 1000 begins and triggers 1005 a buffer status report for a first LCH. The method 1000 includes triggering 1010 a SR for the first LCH based at least in part on the triggered buffer status report. The method 1000 includes determining 1015 whether a SR configuration associated with the first LCH is configured with a set of PUCCH resources for a transmission of a SR on a current active BWP. The method 1000 includes initiating 1020 a RACH procedure for requesting UL resources based on determining that the SR configuration associated with the first LCH is not configured with the set of PUCCH resources for the transmission of the SR on the current active BWP. The method 1000 ends.

Disclosed herein is a first apparatus for efficiently transmitting a SR. In various embodiments, the first apparatus may be a user terminal, such as the remote unit 105, the UE 205, and/or the user equipment apparatus 500. The first apparatus includes a processor and a transceiver that communicates with a mobile communication network. The processor initiates a RACH procedure for an UL SR in response to a triggered SR and receives an UL grant while the RACH procedure is ongoing. The processor prepares a BSR indicating a current buffer status and terminates the RACH procedure in response to transmitting the BSR.

In various embodiments, preparing the BSR includes assembling a MAC PDU containing the BSR. In such embodiments, the processor controls the transceiver to transmit the MAC PDU on an UL resource corresponding to the UL grant. Additionally, the BSR indicates the buffer status up to the last event that triggered a BSR prior to the MAC PDU assembly.

In some embodiments, the processor initiates the RACH procedure due to a pending SR for a LCH that is not configured with PUCCH resources for transmission of a SR signal. In certain embodiments, terminating the RACH procedure includes the processor cancelling the triggered SR. In certain embodiments, terminating the RACH procedure includes the processor canceling the RACH procedure without canceling one or more additional pending SRs.

In some embodiments, the UL grant is not received as part of a RACH procedure. In certain embodiments, the UL grant is addressed to a C-RNTI belonging to the remote unit. In some embodiments, the received UL grant is a response to a second SR for a LCH that is configured with PUCCH resources for transmission of a SR signal.

Disclosed herein is a first method for efficiently transmitting a SR. In various embodiments, the first method may be implemented by a user terminal, such as the remote unit 105, the UE 205, and/or the user equipment apparatus 500. The first method includes initiating, by a remote unit, a RACH procedure for an UL SR in response to a triggered SR and receiving an UL grant while the RACH procedure is ongoing. The first method includes transmitting, by the remote unit, a BSR indicating a current buffer status and terminating the RACH procedure in response to transmitting the BSR.

In some embodiments of the first method, initiating the RACH procedure is triggered due to a pending SR for a LCH that is not configured with PUCCH resources for transmission of a SR signal. In certain embodiments of the first method, terminating the RACH procedure includes cancelling the triggered SR. In certain embodiments of the first method, terminating the RACH procedure includes canceling the RACH procedure without canceling one or more additional pending SRs.

In some embodiments of the first method, the UL grant is not received as part of a RACH procedure. In certain embodiments of the first method, the UL grant is addressed to a C-RNTI belonging to the remote unit. In some embodiments of the first method, the received UL grant is a response to a second SR for a LCH that is configured with PUCCH resources for transmission of a SR signal.

In certain embodiments of the first method, the BSR is transmitted in a MAC PDU on an UL resource corresponding to the UL grant, wherein the BSR indicates the buffer status up to the last event that triggered a BSR prior to the MAC PDU assembly.

Disclosed herein is a second apparatus for efficiently transmitting a SR. In various embodiments, the second apparatus may be a user terminal, such as the remote unit 105, the UE 205, and/or the user equipment apparatus 500. The second apparatus includes a processor and a transceiver that communicates with a mobile communication network. The processor triggers a BSR in response to arrival of data for a first LCH and triggers a SR for the first LCH based on the triggered BSR. The processor determines whether the first LCH is configured with PUCCH resources for transmission of a SR signal and initiates a RACH procedure for requesting UL resources for the first LCH in response to the first LCH not being configured with PUCCH resources for transmission of a SR signal.

In some embodiments, the transceiver receives an UL grant while the RACH procedure is ongoing. Here, the processor transmits (e.g., via the transceiver) the BSR on resources corresponding to the received UL grant and terminating the RACH procedure in response to receiving the UL grant. In such embodiments, terminating the RACH procedure may include canceling the RACH procedure without canceling one or more additional pending SRs.

In certain embodiments, the processor uses a SR configuration of a current active BWP to determine whether the first LCH is configured with PUCCH resources for transmission of a SR signal.

In some embodiments, the processor detects data arrival for a second LCH while requesting UL resources using the RACH procedure is ongoing and determines that there are PUCCH resources for transmission of a SR signal based on the SR configuration of the second LCH. Here, the processor may further determine whether a transmission of a RACH preamble and transmission of the PUCCH resources for transmission of a SR signal are scheduled to overlap in time and postpone the RACH preamble transmission in response to the transmissions being scheduled to overlap in time.

In certain embodiments, initiating the RACH procedure includes the processor determining whether a current active BWP is configured with RACH resources and, in response to the current active BWP not being configured with RACH resources, switching to a particular BWP configured with RACH resources and supporting a SCS allowed for the first LCH. In such embodiments, the particular BWP is different than an initial BWP, the initial BWP being a first BWP assigned to the remote unit upon connecting to a mobile communication network.

In some embodiments, the processor switches an UL/DL BWP from a first BWP to a second BWP in response to initiating the RACH procedure. In such embodiments, the second BWP supports a numerology associated with the first LCH and the first BWP does not support the numerology associated with the first LCH.

In some embodiments, the processor determines whether a current active BWP is configured with RACH resources and suspends the RACH procedure in response to the current active BWP not being configured with RACH resources. In such embodiments, the processor further detects a change to the current active UL BWP, the change resulting in the current active UL BWP being configured with RACH resources, and resumes the RACH procedure in response to the current active UL BWP being configured with RACH resources.

In some embodiments, the processor determines whether a current active UL BWP is configured with RACH resources and terminates the RACH procedure in response to the current active BWP not being configured with RACH resources. Here, the transceiver transmits a SR for the first LCH on an UL control channel resource configured for a second LCH in response to the current active BWP not being configured with RACH resources.

Disclosed herein is a second method for efficiently transmitting a SR. In various embodiments, the second method may be implemented by a user terminal, such as the remote unit 105, the UE 205, and/or the user equipment apparatus 500. The second method includes triggering, by a remote unit, a BSR in response to arrival of data for a first LCH and triggering, by the remote unit, a SR for the first LCH based on the triggered BSR. The second method includes determining whether the first LCH is configured with PUCCH resources for transmission of a SR signal and initiating, by the remote unit, a RACH procedure for requesting UL resources for the first LCH in response to the first LCH not being configured with PUCCH resources for transmission of a SR signal.

In some embodiments, the second method includes receiving an UL grant while the RACH procedure is ongoing and transmitting the BSR on resources corresponding to the received UL grant. In such embodiments, the second method also includes terminating the RACH procedure in response to receiving the UL grant. In certain embodiments, terminating the RACH procedure may include canceling the RACH procedure without canceling one or more additional pending SRs.

In certain embodiments of the second method, determining whether the first LCH is configured with PUCCH resources for transmission of a SR signal is based on a SR configuration of a current active BWP.

In some embodiments, the second method includes detecting data arrival for a second LCH while requesting UL resources using the RACH procedure is ongoing and determining that there are PUCCH resources for transmission of a SR signal based on the SR configuration of the second LCH. Here, the second method also includes determining whether a transmission of a RACH preamble and transmission of the PUCCH resources for transmission of a SR signal are scheduled to overlap in time and postponing the RACH preamble transmission in response to the transmissions being scheduled to overlap in time.

In certain embodiments of the second method, initiating the RACH procedure includes determining whether a current active BWP is configured with RACH resources and switching to a BWP configured with RACH resources and supporting a SCS allowed for the first LCH, in response to the current active BWP not being configured with RACH resources. In such embodiments, the current active BWP configured with RACH resources and supporting a SCS allowed for the first LCH is different than an initial BWP, the initial BWP being a first BWP assigned to the remote unit upon connecting to a mobile communication network.

In some embodiments, the second method includes switching an UL/DL BWP from a first BWP to a second BWP in response to triggering a RACH procedure, wherein the second BWP supports the numerology associated with the first LCH and the first BWP does not support the numerology associated with the first LCH.

In some embodiments, the second method includes determining whether a current active BWP is configured with RACH resources and suspending the RACH procedure in response to the current active BWP not being configured with RACH resources. In such embodiments, the second method further includes detecting a change to the current active UL BWP, the change resulting in the current active UL BWP being configured with RACH resources, and resuming the RACH procedure in response to the current active UL BWP being configured with RACH resources.

In some embodiments, the second method includes determining whether a current active UL BWP is configured with RACH resources and terminating the RACH procedure in response to the current active BWP not being configured with RACH resources. Here, the second method further includes transmitting a SR for the first LCH on an UL control channel resource configured for a second LCH in response to the current active BWP not being configured with RACH resources.

Disclosed herein is a third apparatus for efficiently transmitting a SR. In various embodiments, the third apparatus may be a user terminal, such as the remote unit 105, the UE 205, and/or the user equipment apparatus 500. The third apparatus includes a processor and a transceiver that communicates with a mobile communication network. The processor triggers a BSR in response to arrival of data for a first LCH and triggers a SR for the first LCH based on the BSR. The processor determines whether the first LCH is configured with PUCCH resources for transmission of a SR signal and initiates a RACH procedure for requesting UL resources for the first LCH in response to triggering the SR and in response to the first LCH not being configured with PUCCH resources for transmission of a SR signal. The transceiver receives an UL grant while the RACH procedure is ongoing and transmits the BSR indicating a current buffer status. Moreover, the processor terminates the RACH procedure in response to transmitting the BSR.

In various embodiments, the processor assembles a MAC PDU containing the BSR. In such embodiments, the processor controls the transceiver to transmit the MAC PDU on an UL resource corresponding to the UL grant. Additionally, the BSR indicates the buffer status up to the last event that triggered a BSR prior to the MAC PDU assembly. In some embodiments, terminating the RACH procedure includes cancelling the triggered SR. In certain embodiments, terminating the RACH procedure includes canceling the RACH procedure without canceling one or more additional pending SRs.

In some embodiments, the UL grant is not received as part of a RACH procedure. In certain embodiments, the UL grant is addressed to a C-RNTI belonging to the remote unit. In some embodiments, the received UL grant is a response to a second SR for a second LCH that is configured with PUCCH resources for transmission of a SR signal. In certain embodiments, determining whether the first LCH is configured with PUCCH resources for transmission of a SR signal is based on a SR configuration of a current active BWP.

In some embodiments, the processor detects data arrival for a second LCH while requesting UL resources using the RACH procedure is ongoing and determining that there are PUCCH resources for transmission of a SR signal based on the SR configuration of the second LCH. Here, the processor also determines whether a transmission of a RACH preamble and transmission of the PUCCH resources for transmission of a SR signal are scheduled to overlap in time. In response to the transmissions being scheduled to overlap in time, the processor postpones the RACH preamble transmission.

In certain embodiments, initiating the RACH procedure includes the processor determining whether a current active BWP is configured with RACH resources. In such embodiments, in response to the current active BWP not being configured with RACH resources, the processor may switch to a second BWP configured with RACH resources and supporting a SCS allowed for the first LCH. Here, the second BWP is different than an initial BWP, the initial BWP being a first BWP assigned to the remote unit upon connecting to a mobile communication network.

In some embodiments, the processor switches an UL/DL BWP from a first BWP to a second BWP in response to triggering a RACH procedure. Here, the second BWP supports the numerology associated with the first LCH while the first BWP does not support the numerology associated with the first LCH.

In some embodiments, the processor determines whether a current active BWP is configured with RACH resources. Here, in response to the current active BWP not being configured with RACH resources, the processor suspends the RACH procedure. In such embodiments, the processor resumes the RACH procedure in response to detecting a change to the current active BWP, where the change results in the current active BWP being configured with RACH resources.

In some embodiments, the processor determines whether a current active BWP is configured with RACH resources. Here, in response to the current active BWP not being configured with RACH resources, the processor terminates the RACH procedure. In certain embodiments, the processor may transmit a SR for the first LCH on an UL control channel resource configured for a second LCH in response to the current active BWP not being configured with RACH resources.

Disclosed herein is a third method for efficiently transmitting a SR. In various embodiments, the third method may be implemented by a user terminal, such as the remote unit 105, the UE 205, and/or the user equipment apparatus 500. The third method includes triggering a BSR in response to arrival of data for a first LCH and triggering a SR for the first LCH based on the BSR. The third method includes determining whether the first LCH is configured with PUCCH resources for transmission of a SR signal and initiating a RACH procedure for requesting UL resources for the first LCH in response to triggering the SR and in response to the first LCH not being configured with PUCCH resources for transmission of a SR signal. The third method includes receiving an UL grant while the RACH procedure is ongoing and transmitting the BSR indicating a current buffer status. The third method includes terminating the RACH procedure in response to transmitting the BSR.

In certain embodiments of the third method, the BSR is transmitted in a MAC PDU on an UL resource corresponding to the UL grant, wherein the BSR indicates the buffer status up to the last event that triggered a BSR prior to the MAC PDU assembly. In certain embodiments of the third method, terminating the RACH procedure includes cancelling the triggered SR. In certain embodiments of the third method, terminating the RACH procedure includes canceling the RACH procedure without canceling one or more additional pending SRs.

In some embodiments of the third method, the UL grant is not received as part of a RACH procedure. In certain embodiments of the third method, the UL grant is addressed to a C-RNTI belonging to the remote unit. In some embodiments of the third method, the received UL grant is a response to a second SR for a LCH that is configured with PUCCH resources for transmission of a SR signal.

In certain embodiments of the third method, determining whether the first LCH is configured with PUCCH resources for transmission of a SR signal is based on a SR configuration of a current active BWP.

In some embodiments, the third method includes detecting data arrival for a second LCH while requesting UL resources using the RACH procedure is ongoing and determining that there are PUCCH resources for transmission of a SR signal based on the SR configuration of the second LCH. Here, the third method also includes determining whether a transmission of a RACH preamble and transmission of the PUCCH resources for transmission of a SR signal are scheduled to overlap in time and postponing the RACH preamble transmission in response to the transmissions being scheduled to overlap in time.

In certain embodiments of the third method, initiating the RACH procedure includes determining whether a current active BWP is configured with RACH resources and switching to a BWP configured with RACH resources and supporting a SCS allowed for the first LCH, in response to the current active BWP not being configured with RACH resources. In such embodiments, the current active BWP configured with RACH resources and supporting a SCS allowed for the first LCH is different than an initial BWP, the initial BWP being a first BWP assigned to the remote unit upon connecting to a mobile communication network.

In some embodiments, the third method includes switching an UL/DL BWP from a first BWP to a second BWP in response to triggering a RACH procedure, wherein the second BWP supports the numerology associated with the first LCH and the first BWP does not support the numerology associated with the first LCH.

In some embodiments, the third method includes determining whether a current active BWP is configured with RACH resources and suspending the RACH procedure in response to the current active BWP not being configured with RACH resources. In such embodiments, the third method further includes detecting a change to the current active UL BWP, the change resulting in the current active UL BWP being configured with RACH resources, and resuming the RACH procedure in response to the current active UL BWP being configured with RACH resources.

In some embodiments, the third method includes determining whether a current active UL BWP is configured with RACH resources and terminating the RACH procedure in response to the current active BWP not being configured with RACH resources. Here, the third method further includes transmitting a SR for the first LCH on an UL control channel resource configured for a second LCH in response to the current active BWP not being configured with RACH resources.

Disclosed herein is a fourth apparatus for establishing a multi-access data connection, according to embodiments of the disclosure. The fourth apparatus may be implemented by an endpoint device, such as a remote unit 105, the UE 205, and/or the UE apparatus 500, described above. The fourth apparatus includes a memory comprising instructions executable by the processor to cause the fourth apparatus to: A) trigger a buffer status report for a first LCH; B) trigger a SR for the first LCH based at least in part on the triggered buffer status report; C) determine whether a SR configuration associated with the first LCH is configured with a set of PUCCH resources for a transmission of a SR on a current active BWP; and D) initiate a RACH procedure for requesting UL resources based on determining that the SR configuration associated with the first LCH is not configured with the set of PUCCH resources for the transmission of the SR on the current active BWP.

In some embodiments, the instructions are executable by the processor to cause the fourth apparatus to: A) receive an UL grant while the RACH procedure is ongoing; B) transmit the buffer status report on resources corresponding to the received UL grant; and C) terminate the RACH procedure in response to receiving the UL grant. In certain embodiments, to terminate the RACH procedure, the instructions are executable by the processor to cause the fourth apparatus to cancel the RACH procedure without canceling one or more additional pending SRs.

In some embodiments, the instructions are executable by the processor to cause the fourth apparatus to: A) detect data arrival for a second LCH while the RACH procedure for requesting the UL resources is ongoing; B) determine that there are PUCCH resources for transmission of a SR signal based on a SR configuration associated with the second LCH; C) determine whether a transmission of a RACH preamble and transmission of the PUCCH resources for transmission of the SR signal are scheduled to overlap in time; and D) postpone a RACH preamble transmission in response to the transmissions being scheduled to overlap in time.

In some embodiments, to initiate the RACH procedure, the instructions are executable by the processor to cause the fourth apparatus to: A) determine whether the current active BWP is configured with random access channel resources; and B) switch to a second BWP, in response to the current active BWP being configured without random access channel resources, the second BWP being configured with random access channel resources and supporting a subcarrier spacing allowed for the first LCH. In certain embodiments, the second BWP is different than an initial BWP, wherein the initial BWP comprises a first BWP assigned to the fourth apparatus upon connecting to a mobile communication network.

In some embodiments, the instructions are executable by the processor to cause the fourth apparatus to: A) switch an UL/DL BWP from a first BWP to a second BWP in response to initiating the RACH procedure, where the second BWP supports a numerology associated with the first LCH and the first BWP does not support the numerology associated with the first LCH.

In some embodiments, the instructions are executable by the processor to cause the fourth apparatus to: A) determine whether a current active UL BWP is configured with random access channel resources; and B) suspend the RACH procedure in response to the current active UL BWP not being configured with random access channel resources. In certain embodiments, the instructions are executable by the processor to cause the fourth apparatus to: A) detect a change to the current active UL BWP, wherein the change results in the current active UL BWP being configured with random access channel resources; and B) resume the RACH procedure in response to the current active UL BWP being configured with random access channel resources.

In some embodiments, the instructions are executable by the processor to cause the fourth apparatus to: A) determine whether a current active UL BWP is configured with random access channel resources; B) terminate the RACH procedure in response to the current active UL BWP not being configured with random access channel resources; and C) transmit a SR for the first LCH on an UL control channel resource configured for a second LCH in response to the current active UL BWP not being configured with random access channel resources.

Disclosed herein is a fourth method for establishing a multi-access data connection, according to embodiments of the disclosure. The fourth method may be performed by an endpoint device, such as a remote unit 105, the UE 205, and/or the UE apparatus 500, described above. The fourth method includes triggering a buffer status report for a first LCH and triggering a SR for the first LCH based at least in part on the triggered buffer status report. The fourth method includes determining whether a SR configuration associated with the first LCH is configured with a set of PUCCH resources for a transmission of a SR on a current active BWP and initiating a RACH procedure for requesting UL resources based on determining that the SR configuration associated with the first LCH is not configured with the set of PUCCH resources for the transmission of the SR on the current active BWP.

In some embodiments, the fourth method includes receiving an UL grant while the RACH procedure is ongoing. In such embodiments, the fourth method further includes and transmitting the buffer status report on resources corresponding to the received UL grant and terminating the RACH procedure in response to receiving the UL grant. In certain embodiments, terminating the RACH procedure comprises canceling the RACH procedure without canceling one or more additional pending SRs.

In some embodiments, the fourth method includes detecting data arrival for a second LCH while the RACH procedure for requesting the UL resources is ongoing and determining that there are PUCCH resources for transmission of a SR signal based on a SR configuration associated with the second LCH. In such embodiments, the fourth method includes determining whether a transmission of a RACH preamble and transmission of the PUCCH resources for transmission of the SR signal are scheduled to overlap in time and postponing a RACH preamble transmission in response to the transmissions being scheduled to overlap in time.

In some embodiments, initiating the RACH procedure includes determining whether the current active BWP is configured with random access channel resources and switching to a second BWP, in response to the current active BWP being configured without random access channel resources, the second BWP being configured with random access channel resources and supporting a subcarrier spacing allowed for the first LCH. In certain embodiments, the second BWP is different than an initial BWP, where the initial BWP is a first BWP assigned to the UE upon connecting to a mobile communication network.

In some embodiments, the fourth method includes switching an UL/DL BWP from a first BWP to a second BWP in response to initiating the RACH procedure, wherein the second BWP supports a numerology associated with the first LCH and the first BWP does not support the numerology associated with the first LCH.

In some embodiments, the fourth method includes determining whether a current active UL BWP is configured with random access channel resources and suspending the RACH procedure in response to the current active UL BWP not being configured with random access channel resources. In certain embodiments, the fourth method includes detecting a change to the current active UL BWP, wherein the change results in the current active UL BWP being configured with random access channel resources and resuming the RACH procedure in response to the current active UL BWP being configured with random access channel resources.

In some embodiments, the fourth method includes determining whether a current active UL BWP is configured with random access channel resources and terminating the RACH procedure in response to the current active UL BWP not being configured with random access channel resources. In such embodiments, the fourth method includes transmitting a SR for the first LCH on an UL control channel resource configured for a second LCH in response to the current active UL BWP not being configured with random access channel resources.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A user equipment ("UE") for wireless communication, comprising:
   at least one memory; and
   at least one processor coupled with the at least one memory and configured to cause the UE to:
   trigger a buffer status report for a first logical channel;
   trigger a scheduling request ("SR") for the first logical channel based at least in part on the triggered buffer status report;
   determine whether a SR configuration associated with the first logical channel is configured with a set of physical uplink control channel ("PUCCH") resources for a transmission of a SR on a current active Bandwidth Part ("BWP"); and
   initiate a random-access procedure for requesting uplink resources based on determining that the SR configuration associated with the first logical channel is not configured with the set of PUCCH resources for the transmission of the SR on the current active BWP.

2. The UE apparatus of claim 1, wherein the at least one processor is configured to cause the UE to:
   receive an uplink grant while the random-access procedure is ongoing;
   transmit the buffer status report on resources corresponding to the received uplink grant; and
   terminate the random-access procedure in response to receiving the uplink grant.

3. The UE of claim 2, wherein to terminate the random-access procedure, the at least one processor is configured to cause the UE to cancel the random-access procedure without canceling one or more additional pending SRs.

4. The UE of claim 1, wherein the at least one processor is configured to cause the UE to:
   detect data arrival for a second logical channel while the random-access procedure for requesting the uplink resources is ongoing;
   determine that there are PUCCH resources for transmission of a SR signal based on a SR configuration associated with the second logical channel;
   determine whether a transmission of a random-access preamble and transmission of the PUCCH resources for transmission of a SR signal are scheduled to overlap in time; and
   postpone a random-access preamble transmission in response to the transmissions being scheduled to overlap in time.

5. The UE of claim 1, wherein to initiate the random-access procedure, the at least one processor is configured to cause the UE to:
   determine whether the current active BWP is configured with random access channel resources; and
   switch to a second BWP, in response to the current active BWP being configured without random access channel resources, the second BWP being configured with random access channel resources and supporting a subcarrier spacing allowed for the first logical channel.

6. The UE of claim 5, wherein the second BWP is different than an initial BWP, wherein the initial BWP comprises a first BWP assigned to the UE upon connecting to a mobile communication network.

7. The UE of claim 1, wherein the at least one processor is configured to cause the UE to:
   switch an uplink/downlink BWP from a first BWP to a second BWP in response to initiating the random-access procedure, wherein the second BWP supports a numerology associated with the first logical channel and the first BWP does not support the numerology associated with the first logical channel.

8. The UE of claim 1, wherein the at least one processor is configured to cause the UE to:
   determine whether the current active uplink BWP is configured with random access channel resources; and
   suspend the random-access procedure in response to the current active uplink BWP not being configured with random access channel resources.

9. The UE of claim 8, wherein the at least one processor is configured to cause the UE to:
   detect a change to the current active uplink BWP, wherein the change results in the current active uplink BWP being configured with random access channel resources; and
   resume the random-access procedure in response to the current active BWP being configured with random access channel resources.

10. The UE of claim 1, wherein the at least one processor is configured to cause the UE to:
    determine whether a current active uplink BWP is configured with random access channel resources;
    terminate the random-access procedure in response to the current active uplink BWP not being configured with random access channel resources; and
    transmit a scheduling request for the first logical channel on an uplink control channel resource configured for a second logical channel in response to the current active uplink BWP not being configured with random access channel resources.

11. A method of wireless communication at a user equipment ("UE"), the method comprising:
    triggering a buffer status report for a first logical channel;
    triggering a scheduling request ("SR") for the first logical channel based at least in part on the triggered buffer status report;
    determining whether a SR configuration associated with the first logical channel is configured with a set of physical uplink control channel ("PUCCH") resources for a transmission of a SR on a current active Bandwidth Part ("BWP"); and
    initiating a random-access procedure for requesting uplink resources based on determining that the SR configuration associated with the first logical channel is not configured with the set of PUCCH resources for the transmission of the SR on the current active BWP.

12. The method of claim 11, further comprising:
    receiving an uplink grant while the random-access procedure is ongoing;
    transmitting the buffer status report on resources corresponding to the received uplink grant; and
    terminating the random-access procedure in response to receiving the uplink grant.

13. The method of claim 12, wherein terminating the random-access procedure comprises canceling the random-access procedure without canceling one or more additional pending SRs.

14. The method of claim 11, further comprising:
- detecting data arrival for a second logical channel while the random-access procedure for requesting the uplink resources is ongoing;
- determining that there are PUCCH resources for transmission of a SR signal based on a SR configuration associated with the second logical channel;
- determining whether a transmission of a random-access preamble and transmission of the PUCCH resources for transmission of a SR signal are scheduled to overlap in time; and
- postponing a random-access preamble transmission in response to the transmissions being scheduled to overlap in time.

15. The method of claim 11, wherein initiating the random-access procedure comprises:
- determining whether the current active BWP is configured with random access channel resources; and
- switching to a second BWP, in response to the current active BWP being configured without random access channel resources, the second BWP being configured with random access channel resources and supporting a subcarrier spacing allowed for the first logical channel.

16. The method of claim 15, wherein the second BWP is different than an initial BWP, wherein the initial BWP comprises a first BWP assigned to the UE upon connecting to a mobile communication network.

17. The method of claim 11, further comprising:
- switching an uplink/downlink BWP from a first BWP to a second BWP in response to initiating the random-access procedure, wherein the second BWP supports a numerology associated with the first logical channel and the first BWP does not support the numerology associated with the first logical channel.

18. The method of claim 11, further comprising:
- determining whether a current active uplink BWP is configured with random access channel resources; and
- suspending the random-access procedure in response to the current active uplink BWP not being configured with random access channel resources.

19. The method of claim 18, further comprising:
- detecting a change to the current active uplink BWP, wherein the change results in the current active uplink BWP being configured with random access channel resources; and
- resuming the random-access procedure in response to the current active uplink BWP being configured with random access channel resources.

20. The method of claim 11, further comprising:
- determining whether a current active uplink BWP is configured with random access channel resources;
- terminating the random-access procedure in response to the current active uplink BWP not being configured with random access channel resources; and
- transmitting a scheduling request for the first logical channel on an uplink control channel resource configured for a second logical channel in response to the current active uplink BWP not being configured with random access channel resources.

* * * * *